(12) United States Patent
Bui et al.

(10) Patent No.: US 12,423,068 B1
(45) Date of Patent: Sep. 23, 2025

(54) SYSTEM AND METHOD OF REPOSITORY-LEVEL SEMANTIC GRAPH FOR CODE COMPLETION

(71) Applicant: Quoc Nghi Duy Bui, Ho Chi Minh (VN)

(72) Inventors: Quoc Nghi Duy Bui, Ho Chi Minh (VN); Huy Nhat Phan, Nghe An (VN); Phong Xuan Nguyen, Ha Noi (VN)

(73) Assignee: FPT USA Corp., Richardson, TX (US)

( * ) Notice: Subject to any disclaimer, the term of this patent is extended or adjusted under 35 U.S.C. 154(b) by 0 days.

(21) Appl. No.: 19/064,640

(22) Filed: Feb. 26, 2025

(51) Int. Cl.
*G06F 8/30* (2018.01)
*G06F 8/35* (2018.01)

(52) U.S. Cl.
CPC ..................................... *G06F 8/35* (2013.01)

(58) Field of Classification Search
CPC .................................................. G06F 8/30–35
USPC ........................................................ 717/104
See application file for complete search history.

(56) References Cited

U.S. PATENT DOCUMENTS

| | | | |
|---|---|---|---|
| 2020/0272426 A1* | 8/2020 | Fu | G06N 7/01 |
| 2021/0209072 A1* | 7/2021 | Trim | G06F 40/30 |
| 2022/0261241 A1* | 8/2022 | Balasubramanian | G06N 3/04 |
| 2024/0361996 A1* | 10/2024 | Fu | G06F 8/73 |

* cited by examiner

*Primary Examiner* — Hanh Thi-Minh Bui

(57) ABSTRACT

The invention relates to a repository-level semantic graph system is used for repository-level code completion, the repository-level semantic graph system includes: a source code initialization module, a source code repository module, a Large Language Models (LLM) encoding module, a repository-level semantic graph, a search module, an expansion module, an update module, a re-ranking module, a node selection module, and a Large Language Models (LLM) decoding module.

12 Claims, 5 Drawing Sheets

SYSTEM AND METHOD OF REPOSITORY-LEVEL SEMANTIC GRAPH FOR CODE COMPLETION

FIELD OF THE INVENTION

The invention is in the field of computer technology, specifically a repository-level semantic graph system and method for completing source code to supplement the missing part of an incomplete source code program.

BACKGROUND ART

The advent of AI-assisted code completion tools, such as GitHub Copilot, marks a significant milestone in software development. These tools, while adept at interpreting the immediate context of the code being written, often do not fully exploit the broader context available within the entire code repository. This oversight results in suggestions that might not be optimally aligned with the project's architecture or intended functionality, as these tools tend to overlook the rich information embedded in related files, class hierarchies, dependencies, and more.

To overcome these shortcomings, a direct but complex solution involves enhancing the context length of language models by applying efficient attention techniques. Nonetheless, increasing the context length significantly raises costs and is not feasible indefinitely, especially with respect to the voluminous number of files in a given repository. Hence, there is a crucial need for more refined strategies that accurately identify relevant contexts rather than indiscriminately analyzing every file within a repository.

In response to this challenge, the concept of repository-level code completion has gained traction. It aims to incorporate the full context of a project, including inter-file relationships, imported modules, and the overarching project structure. These methodologies generally employ a similarity-based approach to retrieve contexts for completing a given code snippet, drawing either from raw source code or a pre-constructed database with essential metadata. However, this strategy exhibits significant limitations. It often fails to consider that diverse contexts within the current repository, not necessarily involving similar code, can provide valuable insights for code completion. This includes the intricate network of dependencies, shared utility functions, inter-module method calls, class hierarchies, inter-class dependencies, and encapsulation patterns-all of which are fundamental to program semantics.

Accordingly, the Chinese patent with application number CN117573084B presents a new solution for source code completion. The patent refers to a code completion method based on layer-by-layer merging of abstract syntax trees, which includes the following steps:
(1) Preprocessing each to-be-completed source program in the data set: analyzing the source program to be complemented into a corresponding abstract syntax tree, a control flow chart, a data flow chart and a function call chart, and dividing the preprocessed data set. (2) Constructing a code complement model based on a layer-by-layer fusion abstract syntax tree: gradually constructing a sentence-level abstract syntax tree, an enhanced sentence-level abstract syntax tree and an information enhancement function call graph, extracting information of the information enhancement function call graph by using a graph annotation network to obtain corresponding feature vectors, and generating a complement code according to the feature vectors. (3) Setting all initial parameters and super parameters of the model, loading a training set and a verification set into the model for training, and obtaining optimal parameters for the model after training is finished. And (4) performing code completion by using the model.

Accordingly, the US patent with application number U.S. Pat. No. 11,126,930B2 presents a new solution to supplement source code completion. The invention relates to a code completion system predicts candidates to complete a method invocation in a source code program written in a dynamically-typed programming language. A pseudo type is generated for each variable in the source code program to approximate the runtime type of the variable. The pseudo type is then used to group a set of method invocations into a classification that can be modeled by an n-order Markov chain model. The n-order Markov chain model is used to predict candidate methods more likely to complete a method invocation in a dynamically-typed programming language.

However, the present invention does not provide a semantic graph that can tightly capture the entire layout of a source code repository, nor does it provide an implementation of semantic graph-based searching, expansion, and re-ranking to generate a list of additional code fragments for code completion. Accordingly, our invention presented below addresses these issues.

SUMMARY OF THE INVENTION

The first purpose of the invention is to provide a repository-level semantic graph system is used for repository-level code completion, the repository-level semantic graph system includes:
- a source code initialization module, which is used to generate a query;
- a source code repository module that is a collection of source code that is systematically organized, stored, and generate a context;
- a Large Language Model (LLM) encoding module configured to receive the input query, and embed the context for the query to generate a corresponding node embedding;
- a repository-level semantic graph is the center of the repository-level semantic graph system, which is constructed to encapsulate the broad context of the code repository based on the source code repository module; wherein, the repository-level semantic graph comprises:
- a search module configured to receive as input the node embedding, and search for nodes that are similar to the node embedding to generate a set of anchor nodes in the repository-level semantic graph;
- an expansion module configured to receive as input the set of anchor nodes, and expand nodes in the set of anchor nodes to generate a set of expanded nodes;
- an update module configured to receive as input the set of expanded nodes, and update new context information for each node in the set of expanded nodes to generate a set of updated node embeddings;
- a re-ranking module configured to:
  receive input the set of updated node embeddings and the node embedding;
  re-update the context information when integrating the node embedding into the graph before reranking;
  score the links for nodes using a message-passing network and a link prediction for each node in the set of updated node embeddings against the node embedding for re-ranking, and generating a ranked list of nodes;

a node selection module configured to receive input the list of ranked nodes, select the number of most relevant top nodes in the list of ranked nodes to generate a set of top nodes; and a Large Language Models (LLM) decoding module configured to receive as input the set of top nodes, and the query; extract contexts in the set of top nodes for decoding, complete the code for the query, and generate a final code completion in response to the update module and the source code repository module.

The second purpose of the invention is to provide a method for completing source code using a repository-level semantic graph system comprising: a source code initialization module, a source code repository module, a Large Language Models (LLM) encoding module, a repository-level semantic graph, a search module, an expansion module, an update module, a re-ranking module, a node selection module, and a Large Language Models (LLM) decoding module, the method comprising the following steps:

a) initializing the query and necessary parameters;
  wherein, initializing the query using the source code initialization module;
  wherein, initializing other parameters in the system such as the kNN neighbor search parameter for the search module, the extension parameter for the extension module, and the link prediction for the re-ranking module;
b) assembling, storing code using the source code repository module, and generating a context;
c) receiving the query as input, using the LLM encoding module to embed the context for the query, and generating a node embedding;
d) constructing a semantic graph at the repository-level semantic graph;
e) receiving the node embedding as input, using the search module to search for nodes that are similar to the node embedding, and generating a set of anchor nodes;
f) receiving the set of anchor nodes as input, using the expansion module to expand the nodes in the set of anchor nodes, and generating a set of expanded nodes;
g) receiving the set of extended nodes as input, using the update module to update new context information for each node in the set of extended nodes, and generating a set of updated node embeddings;
h) receiving the set of updated node embeddings as input, and the node embedding, using the re-ranking module to re-update the context information when integrating the node embedding into the graph before re-ranking;
j) scoring the links for the nodes using a message passing network and a predicting links for each node in the set of updated node embeddings for the node embedding, using the re-ranking module to re-rank, and generating a ranked list of nodes;
k) receiving the ranked list of nodes as input, using the node selection module to select the number of most relevant top nodes in the ranked list of nodes, and generating a set of top nodes; and
l) receiving the set of top nodes, and the query as input, using the LLM decoding module to extract the contexts in the top node set for decoding, completing the code for the query, and generate a final code completion in response to the update module and the source code repository module.

These and other advantages of the invention will become apparent to those of ordinary skill in the art after reading the following detailed description of the preferred embodiments, illustrated in the various drawings.

BRIEF DESCRIPTION OF DRAWINGS

The accompanying drawings are incorporated and form part of this invention to illustrate the independent and dependent claims of the invention, as well as to serve to explain the operating principles of the entire technical solution, in which:

The illustrations are intended solely to illustrate various embodiments of the technology. A person of ordinary skill in engineering will readily recognize from the following detailed descriptions that alternative embodiments of the structures and methods illustrated in this document can be used without departing from the principles of the technology described in this document.

DETAILED DESCRIPTION OF THE INVENTION

The following section will elaborate on the preferred embodiments of the invention, illustrated by examples in the accompanying drawings. Although the invention will be described along with the preferred embodiments, the invention is not limited to these embodiments. In fact, the invention is intended to provide flexibility in selecting alternative, improved and quantitative embodiments, which may be included within the spirit and scope of the invention, as determined by the claims.

Furthermore, in the following detailed description of the invention, many specific details will be given to provide a clear understanding of the invention. However, the reader having ordinary knowledge in the art will find that the invention can be implemented without these specific details. In other cases, previously known methods, processes, compositions and areas of application are not described in detail so as not to obscure unnecessary aspects of the invention.

The headings provided herein are for convenience in describing the invention and are not to be construed as restricting disclosure in any way.

Hereinafter, the invention is described in detail with specific implementations and examples with reference to the accompanying drawings, however, these implementations and examples are only intended to illustrate and clarify the nature of the invention and do not limit the scope of the invention's protection claims.

Figure 1:
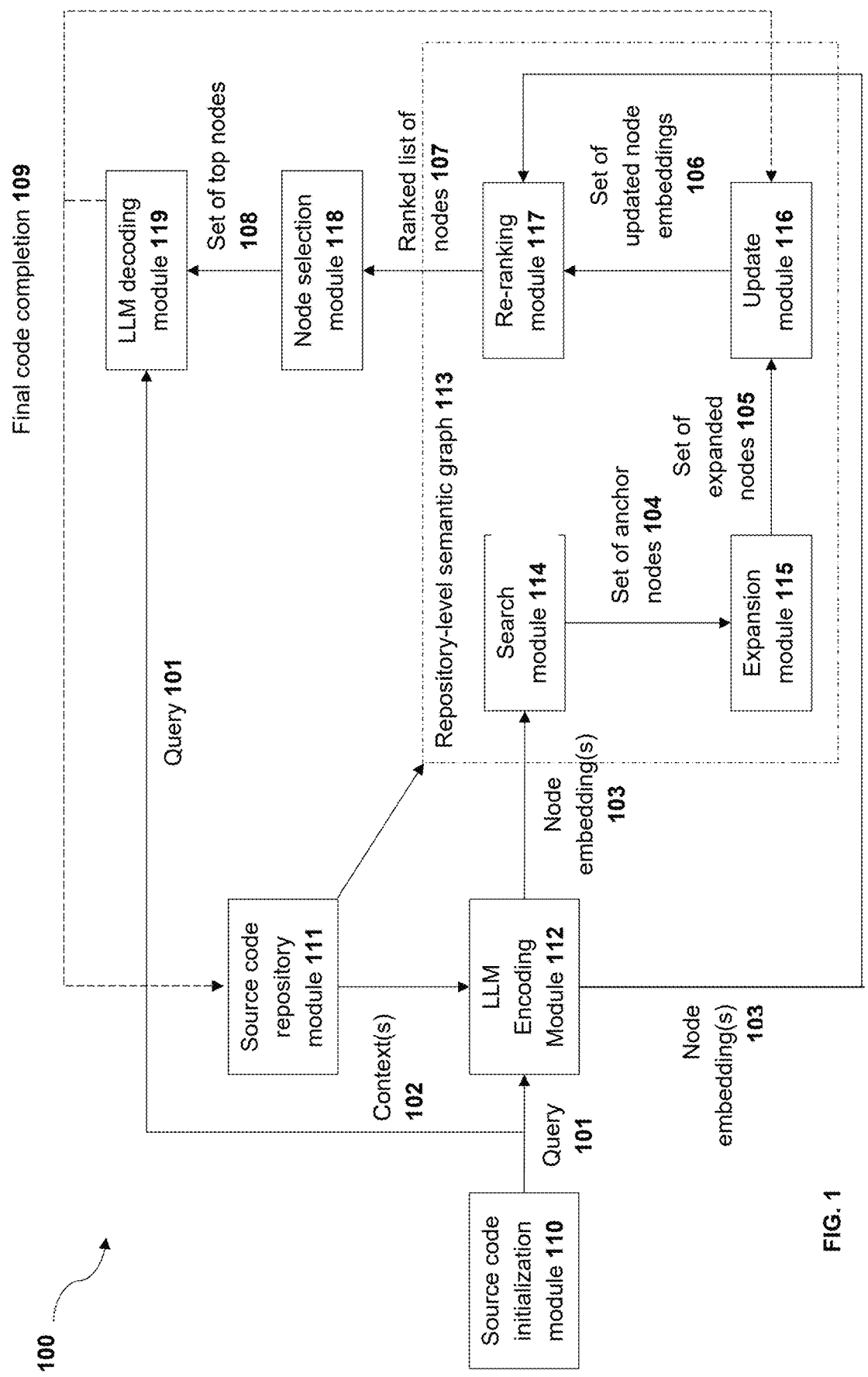
FIG. 1 is an illustration of a repository-level semantic graph system for code completion according to an exemplary embodiment of the invention.

Referring to FIG. 1, which illustrates a repository-level semantic graph system ("system 100") for code completion according to an exemplary embodiment of the invention.

The repository-level semantic graph system 100, also referred to as the RepoHyper system, is a multifaceted framework designed to address complex problems associated with repository-level code completion that includes: a source code initialization module 110, a source code repository module 111, a Large Language Models (LLM) encoding module 112, a repository-level semantic graph 113, a search module 114, an expansion module 115, an update module 116, a reranking module 117, a node selection module 118, and a Large Language Models (LLM) decoding module 119.

Figure 2C:
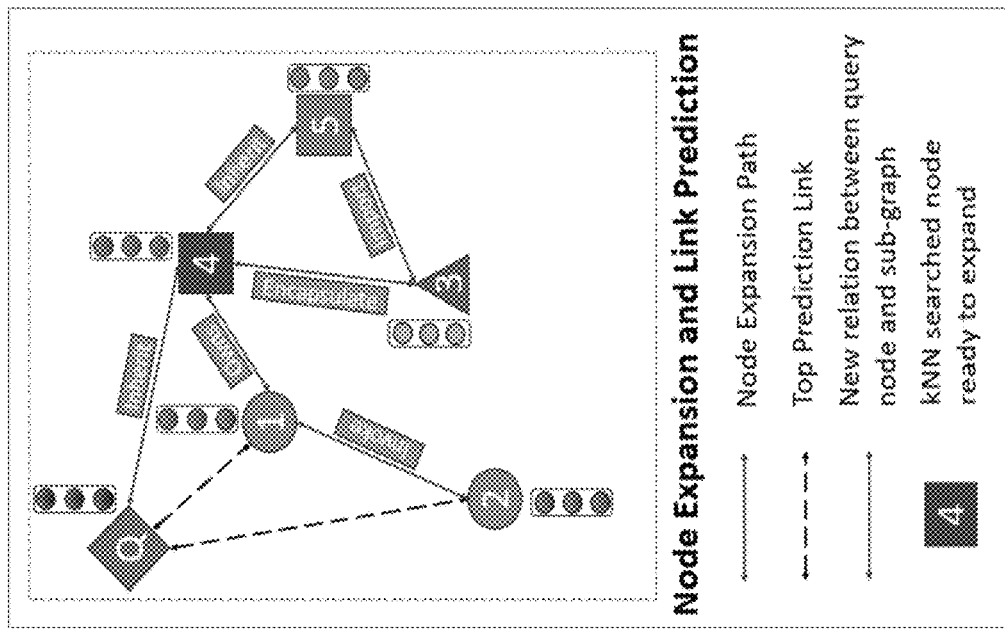
FIG. 2C illustrates an example of a sub-semantic graph after expansion and re-ranking according to an exemplary embodiment of the invention.

In FIG. 1, the source code initialization module 110 is used to generate a query 101. Wherein, the query 101 is an incomplete query code generated by the source code initialization module 110. Reference is made to FIG. 2A for an illustration of an example query code according to an exemplary embodiment of the invention. Specifically in FIG. 2A, the TensorHandler class is constructed as a handler for tensors (multidimensional arithmetic array data). It inherits the functionality of the ArrHandler class and further extends the ability to process tensor data by using the convert and add_arrays functions.

The source code repository module 111 is a collection of source code that is systematically organized, stored, and generates a context 102. The source code repository module 111 typically contains source code files, libraries, classes, methods, functions, and other related documentation of a project.

The LLM (Large Language Models) encoding module 112 uses a large language model configured to receive the input query 101, and embeds the context 102 for the query 101 to generate the corresponding node embedding 103. The encoding helps to convert the existing incomplete query code into a semantic vector before entering the graph to perform further steps to complete the code.

The repository-level semantic graph 113 is the center of the repository-level semantic graph system 100, which is constructed to encapsulate the broad context of the code repository based on the source code repository module 111. The graph includes a plurality of nodes and multiple edges between the plurality of nodes, the plurality of edges representing dependencies and relationships between multiple elements in the source code.

In which, the repository-level semantic graph 113 is represented by the formula: G=(V,E). In which, G is the repository-level semantic graph, V is the set of nodes, E is the set of relationships, aiming to capture the basic units of the overall project context and the complex relationships between them.

Figure 2B:
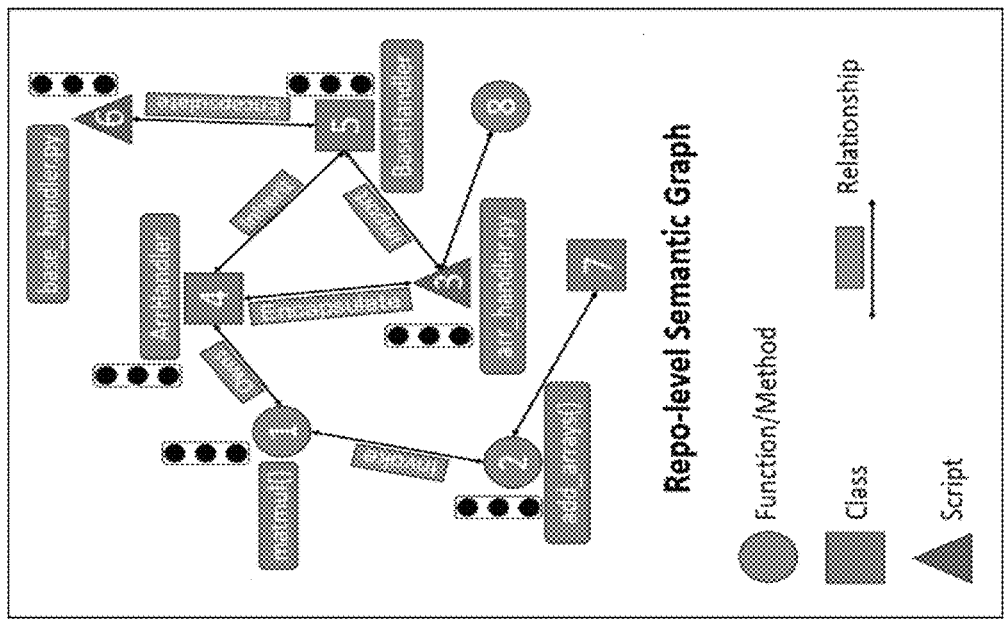
FIG. 2B illustrates an example of a connection between nodes in a repository-level semantic graph according to an exemplary embodiment of the invention.
Figure 2A:
FIG. 2A illustrates an example of a query code according to an exemplary embodiment of the invention.

Refer to FIG. 2B for an illustration of an example of the connection between nodes in a repository-level semantic graph according to an exemplary embodiment of the invention. Wherein, nodes 1 to 8 consisting of functions/methods (circles), classes (squares) are the basic units due to their important roles in the program structure, and after extracting the functions and classes, the remaining file contents, such as import statements and non-functional code, is encapsulated in a script node (triangle). In the semantic graph, each node consists of a name, context (body of the function/method), parameters, and location.

In addition, the nodes in the repository-level semantic graph 113 are interconnected based on the following types of relationships: (1) Import relations: These relations (Imports and Imported By) exist between script nodes and the imported modules identified from the script's import statements. This excludes external modules not within the project's scope; (2) Invoke relations: These relations (Caller and Callee) exist between functions (or methods) when one node invokes another; (3) Ownership relations: These relations (Owns and Owned By) exist between methods and the classes that contain them; (4) Encapsulate relations: These relations (Enclose and Enclosed By) exist between script nodes and other nodes that have code snippets contained within the file represented by the script node; and (5) Class hierarchy relations: These relations (Inherits and Inherited By) exist between classes. The relationships in FIG. 2B are denoted by rectangles.

In summary, in the repository-level semantic graph 113, there are three types of nodes: function/method, class, and script node; the edges between these nodes represent five different relationships including import, in-voke, ownership, encapsulation, and class hierarchy. The associations are implemented for Python but can be adapted for use in other programming languages, such as Java or C++. This adaptation includes the use of different program components as semantic units and their relationships in the semantic graph.

Continuing with FIG. 1, the repository-level semantic graph 113 includes: the search module 114, the expansion module 115, the update module 116, and the re-ranking module 117.

The search module 114 is configured to receive as input the node embedding 103, and search for nodes that are similar to the node embedding 103 to generate a set of anchor nodes 104 in the repository-level semantic graph 113. Wherein, the node embedding 103 is a semantic representation of one or more nodes in a vector space that allows the model to understand and compute the relationships between the nodes. The search module 114 performs a k-Nearest Neighbor (k-NN) search to find k nodes that are similar to the node embedding 103 using the formula:

$$A = \{V_i \in i \in kNN(G, Z_Q)\};$$

wherein:
A is a set of anchor nodes;
G is a repository-level semantic graph;
Q is the input query;
i is the i-th node in the kNN search set;
$V_i$ is the i-th anchor node in set A;
$Z_Q$ is the query vector, which represents the semantics or features of the query Q, also known as the node embedding;
kNN(G, $Z_Q$) is the set of k nodes searched for kNN in graph G that have the highest similarity to the query vector $Z_Q$.

In which, to expand set A the strategic extension used is F:

$$A_{exp} = F(A);$$

in which, $A_{exp}$ is the set of expansion nodes; F(A) is the expansion strategy from the original set A.

The search module 114 searches for the k nodes that are most similar to the query vector $Z_Q$ in the graph G, and then expands the set of anchor nodes in the set A that serves as the starting point using strategy F to determine the appropriate file for decoding in the archive.

The expansion module 115 is configured to receive as input the set of anchor nodes 104, and expands the nodes in the set of anchor nodes 104 to generate a set of expanded nodes 105. Therein, the expansion module 115 performs the expansion using an exhaustive search strategy, and a pattern search strategy. Specifically, the exhaustive search strategy uses a Breadth First Search (BFS) algorithm, and a pattern search strategy.

Wherein, the pattern search strategy applies pattern filtering using frequent path sets with the formula:

$$A_{exp} = \{V_i | V_i \in F_{exh}(A), \text{PATH}(V_j, V_i) \in P\};$$

wherein:
- $A_{exp}$ is the set of extended nodes;
- $V_i$, $V_j$ are the i-th and j-th anchor nodes of set A;
- PATH($V_j$, $V_i$) is the type of BFS path from node $V_j \in A$ to any node $V_i$;
- $F_{exh}(A)$ is the set of nodes searched from set A via exhausted search;
- P is the set of most frequent paths.

Starting from anchor nodes $V_i \in A$ perform kNN search expansion to target node $V_{target}$ using simple Breadth First Search (BFS) algorithm with maximum depth D. In practice, setting D≥3 may result in the BFS covering nearly 50% of the graph so another parameter alongside D to constrain the number of BFS expanded nodes: the maximum number of nodes per BFS denoted as M. Limiting the number of BFS nodes is done by collecting the most frequent paths into path set P. This is called pattern search as it will eliminate infrequent paths during the exhaustion search.

For example, let's consider a node $V_j$ identified by the k-nearest neighbor (kNN) search, and a target node $V_{target}$ representing the "gold snippet" (e.g., a method called by $V_j$). There can be multiple paths from $V_j$ to $V_{target}$. One such path could be: $V_j$ (method)→(owned by) $V_1$ (class)→(encapsulated in) $V_2$ (script)→(import) $V_{target}$. This path has a type of (ownership, encapsulate, import), represented in FIG. 2B and FIG. 2C by the edge types (3, 4, 1). However, since there are multiple paths from $V_j$ to $V_{target}$, including all the nodes produced by these paths might introduce irrelevant contexts into the subgraph.

Another example, $V_j$ can reach $V_{target}$ through a more useful path like: $V_j$ (method)→(owned by) $V_1$→(owns) $V_3$ (method)→(call) $V_{target}$. This path is more useful because $V_3$ (method) can provide hints on how to call $V_{target}$, whereas the previous path included $V_2$ (script), which is a longer context and less useful for understanding how to use $V_{target}$.

In the training set of RepoBench-R, for each sample, there will be a gold snippet and an in-file context. The system first uses kNN search to find the k most similar context nodes to the in-file context. Then, the search module 114 performs an exhaustive search from these identified nodes to collect all possible paths leading to the gold snippet. For example, in sample 1, the path types (3, 4, 1) and (1, 2, 3) can be collected, while in sample 2, the path types (3, 4, 1) and (2, 4) can be found. The most frequent path type in the training set is (3, 4, 1), which appears twice in this example.

In the training set of RepoBench-R, for each sample, every snippet parsed from import statements is treated as a potential candidate for next-line prediction, also known as the gold snippet. For example, the definitions of two following imported functions: add and minus as the snippets and the gold snippet is the optimal context for prediction, here which is "add" from src import add, minus nextline: add(1,2).

The term "RepoBench" refers to a comprehensive benchmark suite specifically designed to evaluate the performance of repository-level code completion systems. RepoBench-R is for code retrieval, RepoBench-C is for code completion, and RepoBench-P combines both aspects to simulate the entire workflow of a real-world code completion system, allowing for a comprehensive and balanced evaluation.

The update module 116 is configured to receive as input the set of expanded nodes 105, and update the new context information for each node in the set of expanded nodes 105 to generate a set of updated node embeddings 106. The update module 116 and the re-ranking module 117 use a deep learning model, namely a graph neural network (GNN), to generate or update the node embedding for each node if there is a change due to a source code update. The graph neural network (GNN) is a type of neural network specifically designed to process data structured in the form of a graph, including nodes (vertices) and edges connecting the nodes. Updating or computing the embeddings of the nodes in the set of expanded nodes 105 to ensure that all nodes have the latest representation reflecting their positions and relationships in the graph is also considered as generating the node embeddings before re-ranking.

The re-ranking module 117 is configured to receive as input the set of updated node embeddings 106 and the node embedding 103. The reranking module 117 then performs a re-update of the context information by integrating the node embedding 103 into the subgraph before reranking. A subgraph, also known as a sub-semantic graph, is a graph of connections between nodes in the set of updated node embeddings 106 after performing a search, expansion, and update. Integrating the node embedding 103 into this subgraph enables a comprehensive understanding of the context of the code, enabling the message passing network to make informed predictions from the connections and dependencies between nodes and edges. Finally, score the links for nodes using a message-passing network and a link prediction for each node in the set of updated node embeddings 106 against the node embedding 103 to re-rank using the link prediction results, and generate a ranked node list 107.

In which, the re-ranking module 117 uses the GraphSAGE algorithm (Graph SAmple and aggreGatE) with L layers in a graph neural network (GNN) to update the context when the node embedding 103 into the graph using the formula:

$$Z_i^{(l)} = h(Z_i^{(l-1)}, \{Z_j^{(l-1)}\}_{(i,j) \in G_1});$$

- $Z_i^{(l)}$ is the embedding of node i at layer l;
- h is the non-linear learning function, synthesizing the embedding of node i and its neighboring nodes;
- $Z_i^{(l-1)}$ is the embedding of node i at layer l−1;
- $Z_j^{(l-1)}$ is the embedding of node j adjacent to node i at layer l−1;
- $(i,j) \in G_1$ is the set of edges connecting node i and nodes j in the graph.

Wherein the re-ranking module 117 uses the final node embeddings after going to a messaging network to calculate the association score, and determines the relevance of each context to the node embedding 103. The message passing network formula used is:

$$Z_i^{(L)} = f(Z_i^{(0)}, G \oplus Q);$$

- wherein, $Z_i^{(0)}$ is the initial embedding obtained from the encoder for the ith node in the graph;
- $Z_i^{(L)}$ is the final layer L embedding after going to the message passing network f;
- $G \oplus Q$ is the continuation of the query node Q where the query is the raw source code of the node and $Z_Q$ is the initial embedding into the graph G.

Next, the re-ranking module 117 uses link prediction to calculate a link score having the formula:

$$s_i = W^T \text{concat}(Z_i^{(L)}, Z_Q^{(L)}) \forall i \in \{i | V_i \in A_{exp}\};$$

wherein:
- $s_i$ is the linking score between query node Q and node i;
- W is a parameter that acts as a weight vector;
- $Z_i^{(L)}$ is the embedding of node i after L layers;
- $Z_Q^{(L)}$ is the embedding of query node Q after L layers;

concat ($Z_i^{(L)}$, $Z_Q^{(L)}$) is the concatenation of two vectors $Z_i^{(L)}$ và $Z_Q^{(L)}$;

$A_{exp}$ is the set of expanded nodes.

The node link prediction for each query uses the trained loss function whose formula is:

$$L = -\frac{1}{N_1}\sum_{i=1}^{N_1} Y_i \log \hat{Y}_1 \text{ where } \hat{Y}_i = \frac{1}{1+e^{-s_i}};$$

wherein:

L is the binary cross-entropy loss function;

$N_1$ is the number of initially selected nodes;

$Y_i$ is the actual label of node i;

$\hat{Y}$ is the predicted value of the link probability;

$s_i$ is the linking score between query node Q and node i.

Reference is made to FIG. 2C which illustrates an example of a sub-semantic graph after expansion and re-ranking according to an exemplary embodiment of the invention. The example in FIG. 2C shows a query node Q used as a starting point when incorporated into the sub-semantic graph after expansion and re-ranking. The query node Q's links to other nodes also change, including the following: node expansion path, top prediction link, new relation between query node and sub-graph, and pruned edge and node outside expansion paths.

Continuing with FIG. 1, the node selection module 118 is configured to receive as input the list of ranked nodes 107, select the number of most relevant top nodes in the list of ranked nodes 107 to generate a set of top nodes 108.

The LLM (Large Language Models) decoder module 119 is configured to receive as input the set of top nodes 108, and the query 101. It then extracts contexts in the set of top nodes 108 for decoding, completes the code for the query 101, and generate a final code completion 109 in response to the update module 116 and the source code repository module 111. Therein, the LLM decoder module 119 uses a large language model, Code LLM, to generate a complete code snippet based on the relevant contexts of the set of top nodes 108, and the query 101. The formula that the LLM decoder module uses to complete the final code is:

$$C=LLM(Q,[P_{g1};P_{g2};\ldots;P_{gN_2}]);$$

wherein:

C is the output, which is the complete code;

Q is the input query;

$P_{gi}$ is the code representation or $N_2$ context of the i-th node $V_i$ in the graph.

Wherein, the final code completion 109 will respond to the update module 116 and the source code repository module 111 is stored in the following dataset:

$$R=\{(G_i,Y_{optimal}^i,Q^i)\};$$

R is the dataset including information about the graph, optimal nodes, and queries;

$G_i$ is the semantic graph of the i-th code repository;

$Y_{optimal}^i$ is the optimal node whose context corresponds to query $Q^i$;

$Q^i$ is the input query.

The final code completion 109 will respond to the update module 116 and the source code repository module 111 is stored in the dataset R for the purpose of serving subsequent code completion tasks or result checking, as well as updating and improving the model in the repository-level semantic graph system 100 through this training dataset.

Figure 3:
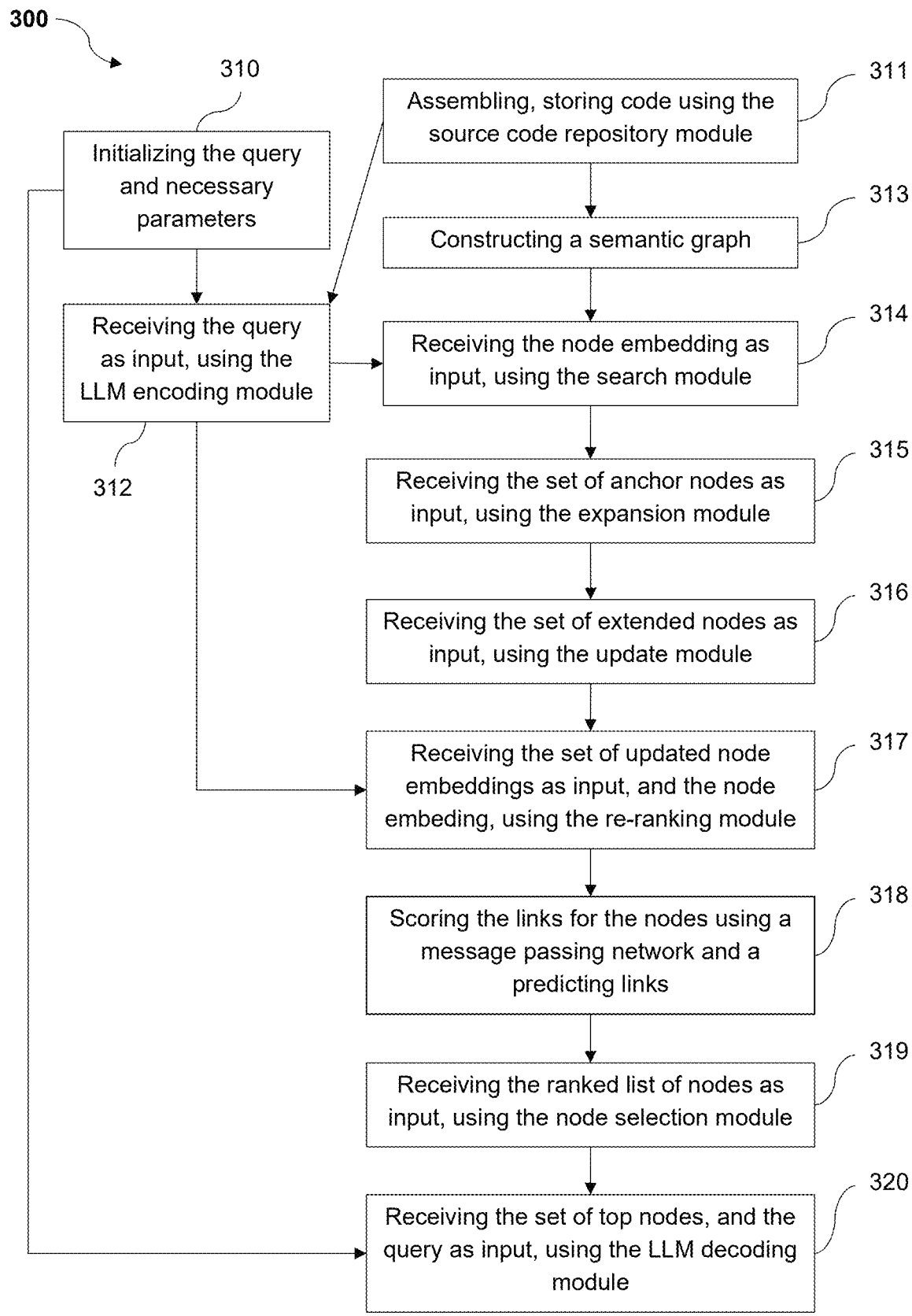
FIG. 3 illustrates a method for completing source code using a repository-level semantic graph system according to an exemplary embodiment of the invention.

Referring to FIG. 3, an illustration of a source code completion method ("method 300") using a repository-level semantic graph system 100 is provided in accordance with an exemplary embodiment of the present invention. Specifically, the source code completion method 300 using a repository-level semantic graph system 100 comprises: a source code initialization module 110, a source code repository module 111, a Large Language Models (LLM) encoding module 112, a repository-level semantic graph 113, a search module 114, an expansion module 115, an update module 116, a re-ranking module 117, a node selection module 118, and a Large Language Models (LLM) decoding module 119.

For convenience, method 300 will be described as being implemented by a system comprising one or more computers located at one or more locations. For example, a neural network system, e.g., the repository-level semantic graph system 100 of FIG. 1, suitably programmed in accordance with this specification, may implement method 300.

Step 310, the system initializes the query 101 and the necessary parameters, wherein, initializing the query 101 using the source code initialization module 110. Wherein, initializing other parameters in the system such as the kNN neighbor search parameter for the search module 114, the extension parameter for the extension module 115, and the link prediction for the re-ranking module 117.

Step 311, the system assembles and stores the code using the source code repository module 111, and generates a context 102.

Step 312, the system receives the query 101 in step 310 as input, uses the LLM encoding module 112 to embed the context 102 generated in step 311 for the query 101, and generates a corresponding node embedding 103.

Step 313, constructs the semantic graph at the repository level semantic graph 113. The construction of the semantic graph is intended to encapsulate the broad context of the code repository collected and stored using the source code repository module 111 in step 311.

In which, the repository-level semantic graph 113 is represented by the formula: G=(V,E). In which, G is the repository-level semantic graph, V is the set of nodes, E is the set of relationships, aiming to capture the basic units of the overall project context and the complex relationships between them.

Step 314, the system receives the node embedding 103 in step 312 as input, uses the search module 114 to search for nodes that are similar to the node embedding 103, and generates a set of anchor nodes 104 in the repository level semantic graph 113. Specifically, perform a k-Nearest Neighbor search to find k nodes that are similar to the node embedding 103 using the formula:

$$A=\{V_i\in i\in kNN(G,Z_Q)\};$$

wherein:

A is a set of anchor nodes;

G is a repository-level semantic graph;

Q is the input query;

i is the i-th node in the kNN search set;

$V_i$ is the i-th anchor node in set A;

$Z_Q$ is the query vector, which represents the semantics or features of the query Q, also known as the node embedding;

KNN(G, $Z_Q$) is the set of k nodes searched for kNN in graph G that have the highest similarity to the query vector $Z_Q$.

Step 315, the system receives the set of anchor nodes 104 in step 314 as input, uses the expansion module 115 to expand the nodes in the set of anchor nodes 104, and generates a set of expanded nodes 105. Specifically, exhaustively searches using the Breadth First Search (BFS) algorithm, and the pattern search algorithm.

Wherein, from the anchor nodes V in set A, the kNN search expansion in step 314 is performed to the target node $V_{target}$ using the Breadth First Search (BFS) algorithm with a maximum depth of D and the maximum number of nodes per BFS is denoted as M.

In which, to expand set A the strategic extension used is F:

$$A_{exp}=F(A);$$

in which, $A_{exp}$ is the set of expansion nodes;

F(A) is the expansion strategy from the original set A.

Wherein, the pattern search strategy applies pattern filtering using frequent path sets with the formula:

$$A_{exp}=\{V_i \in V_i \in F_{exh}(A), PATH(V_j,V_i) \in P\};$$

wherein:

$A_{exp}$ is the set of extended nodes;

$V_i$, $V_j$ are the i-th and j-th anchor nodes of set A;

PATH($V_j$,$V_i$) is the type of BFS path from node $V_j \in A$ to any node $V_i$;

$F_{exh}(A)$ is the set of nodes searched from set A via exhausted search;

P is the set of most frequent paths.

Step 316, the system receives the set of expanded nodes 105 in step 315 as input, uses the update module 116 to update new context information for each node in the set of extended nodes 105, and generates a set of updated node embeddings 106. Therein, a graph neural network (GNN) is used to generate or update the node embedding for each node if there is a change due to the source code update.

Step 317, the system receives as input the set of updated node embeddings 106 in step 316, and the node embedding 103 in step 312, and uses the re-ranking module 117 to re-update the context information when integrating the node embedding 103 into the graph before re-ranking. Specifically, step 317 uses the GraphSAGE (Graph SAmple and aggreGatE) algorithm with L layers in the graph neural network (GNN) to update the context when the node embedding 103 into the graph using the formula:

$$Z_i^{(l)}=h(Z_i^{(l-1)},\{Z_j^{(l-1)}\}_{(i,j) \in G_1});$$

$Z_i^{(l)}$ is the embedding of node i at layer l;

h is the non-linear learning function, synthesizing the embedding of node i and its neighboring nodes;

$Z_i^{(l-1)}$ is the embedding of node i at layer l−1;

$Z_j^{(l-1)}$ is the embedding of node j adjacent to node i at layer l−1;

(i,j)∈$G_1$ is the set of edges connecting node i and nodes j in the graph.

Step 318, the system scores the links for the nodes using a message passing network and a predicting links for each node in the set of updated node embeddings 106 for the node embedding 103 after performing the context information update in step 317, uses the re-ranking module 117 to re-rank using the link prediction results, and generates a ranked list of nodes 107.

The message passing network formula used is:

$$Z_i^{(L)}=f(Z_i^{(0)},G \oplus Q);$$

wherein, $Z_i^{(0)}$ the initial embedding obtained from the encoder for the ith node in the graph;

$Z_i^{(L)}$ is the final layer L embedding after going to the message passing network f;

G⊕Q is the continuation of the query node Q where the query is the raw source code of the node and $Z_Q$ is the initial embedding into the graph G.

The link prediction for calculating the link score has the formula:

$$s_i=W^T concat(Z_i^{(L)},Z_Q^{(L)}) \forall_i \in \{i|V_i \in A_{exp}\};$$

wherein:

$s_i$ is the linking score between query node Q and node i;

W is a parameter that acts as a weight vector;

$Z_i^{(L)}$ is the embedding of node i after L layers;

$Z_Q^{(L)}$ is the embedding of query node Q after L layers;

concat ($Z_i^{(L)}$, $Z_Q^{(L)}$) is the concatenation of two vectors $Z_i^{(L)}$ và $Z_Q^{(L)}$;

$A_{exp}$ is the set of expanded nodes.

The node link prediction for each query uses the trained loss function whose formula is:

$$L = -\frac{1}{N_1}\sum_{i=1}^{N_1} Y_i \log \hat{Y}_1 \text{ where } \hat{Y}_i = \frac{1}{1+e^{-s_i}};$$

wherein:

L is the binary cross-entropy loss function;

$N_1$ is the number of initially selected nodes;

$Y_i$ is the actual label of node i;

$\hat{Y}_i$ is the predicted value of the link probability;

$s_i$ is the linking score between query node Q and node i.

Step 319, the system receives the ranked list of nodes 107 in step 318 as input, uses the node selection module 118 to select the number of most relevant top nodes in the ranked list of nodes 107, and generates the top node set 108.

Step 320, the system receives the top node set 108 in step 319, and the query 101 in step 310 as input, uses the LLM decoding module 119 to extract contexts in the top node set 108 for decoding, completes the code for query 101, and generate a final code completion 109 in response to the update module 116 and the source code repository module 111.

The formula used to complete the final code is:

$$C=LLM(Q,[P_{g1};P_{g2}; \ldots ;P_{gN_2}]);$$

wherein:

C is the output, which is the complete code;

Q is the input query;

$P_{gi}$ is the code representation or $N_2$ context of the i-th node $V_i$ in the graph.

The final code completion 109 will respond to the update module 116 and the source code repository module 111 is stored in the following dataset:

$$R=\{(G_i,Y_{optimal}^i,Q^i)\};$$

R is the dataset including information about the graph, optimal nodes, and queries;

$G_i$ is the semantic graph of the i-th code repository;

$Y^i_{optimal}$ is the optimal node whose context corresponds to query $Q^i$;

$Q^i$ is the input query.

Figure 4:
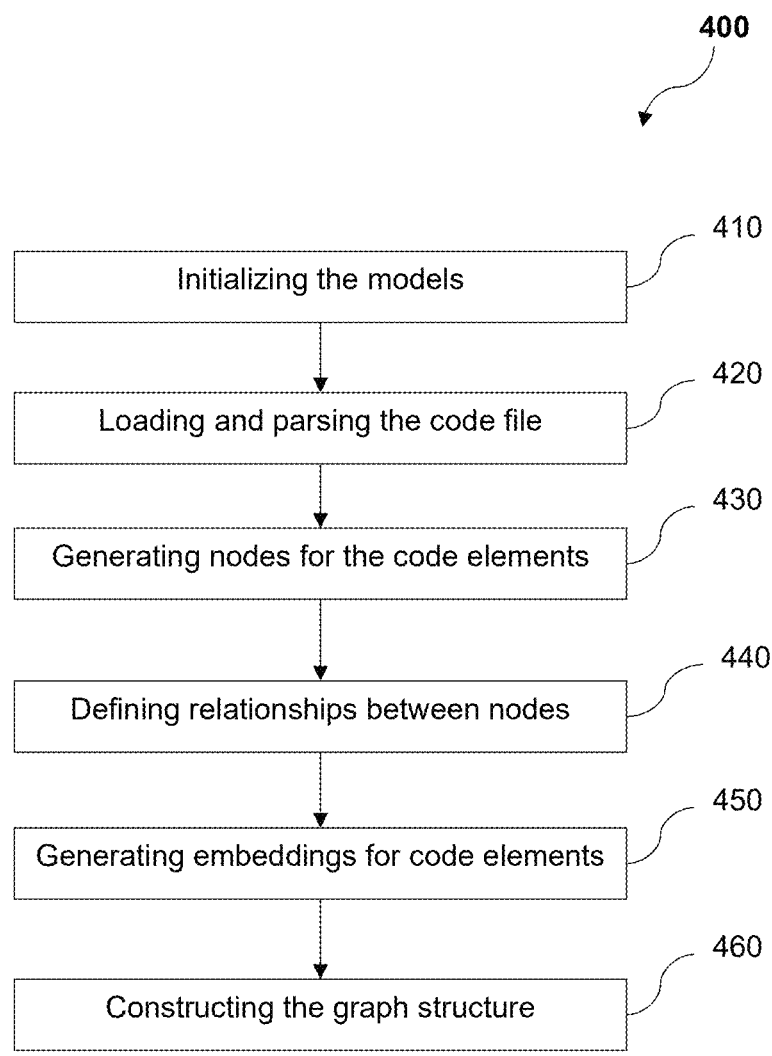
FIG. 4 illustrates a method for constructing a repository-level semantic graph according to an exemplary embodiment of the invention.

Referring to FIG. 4, which illustrates a method for constructing a repository-level semantic graph ("method 400") according to an exemplary embodiment of the invention, the method for constructing a semantic graph 400 at the repository-level semantic graph 113 at step 313 is performed in the following steps:

Step 410, initializing the models. Specifically, initialize the models by importing all the necessary libraries and models, ensuring that the necessary infrastructure such as an abstract syntax parser (AST), a call graph generator, or a class hierarchy parser is in place.

Step 420, loading and parsing the code file is performed after step 410. In this step, receive as input the directory path containing the code files. Then, parse each file in the directory by parsing the file with a tree-sitter to extract the abstract syntax tree (AST); identify and extract functions, classes, and methods from the AST; and store each element with its name, context (body), parameters, and location. Finally, generate a extracted code elements (functions, classes, methods, scripts).

The term "tree-sitter" refers to a tool used for parsing source code. It is designed to provide syntax trees that are accurate, efficient, and can be updated quickly when the source code changes.

Step 430, generating nodes for the code elements. In this step, receive the extracted code elements (functions, classes, methods, scripts) in step 420 as input and initialize an empty graph structure. Then, for each extracted code element, generate a node in the graph and attach metadata such as name, parameters, and context to the node.

Step 440, defining relationships between nodes which is done after creating nodes in step 430. In step 440, defining the relationships between nodes will initialize dictionaries for different types of relationships: import, invoke, ownership, encapsulate, class hierarchy. In this, for each code element, it identifies imports and creates edges for imported elements, identifies function/method calls and creates invocation edges via call graph generator, identifies parent-child relationships between classes and methods and creates ownership edges, identifies file-level script scopes and creates encapsulation edges, and identifies class inheritance and creates class hierarchy edges. Finally, generate a code contexts of nodes.

Step 450, generating embeddings for code elements that receive input as the code context of the nodes in step 440. Each node in the graph will be processed using an encoder-only embedding model such as CodeT5 or UniXcoder to generate an embedding representing the semantic meaning of the code element that is used for comparison as well as retrieval of relevant contexts later, and store the embedding in a dictionary mapped to the node. Finally, generate an embedding for each node.

Step 460, constructing the structural graph that receives the embedding for each node in step 450 and then performs graph construction by adding all nodes and edges to the graph based on the defined relationships. Ensure all nodes are connected according to the defined relationships (import, call, own, encapsulate, class hierarchy).

Figure 5:
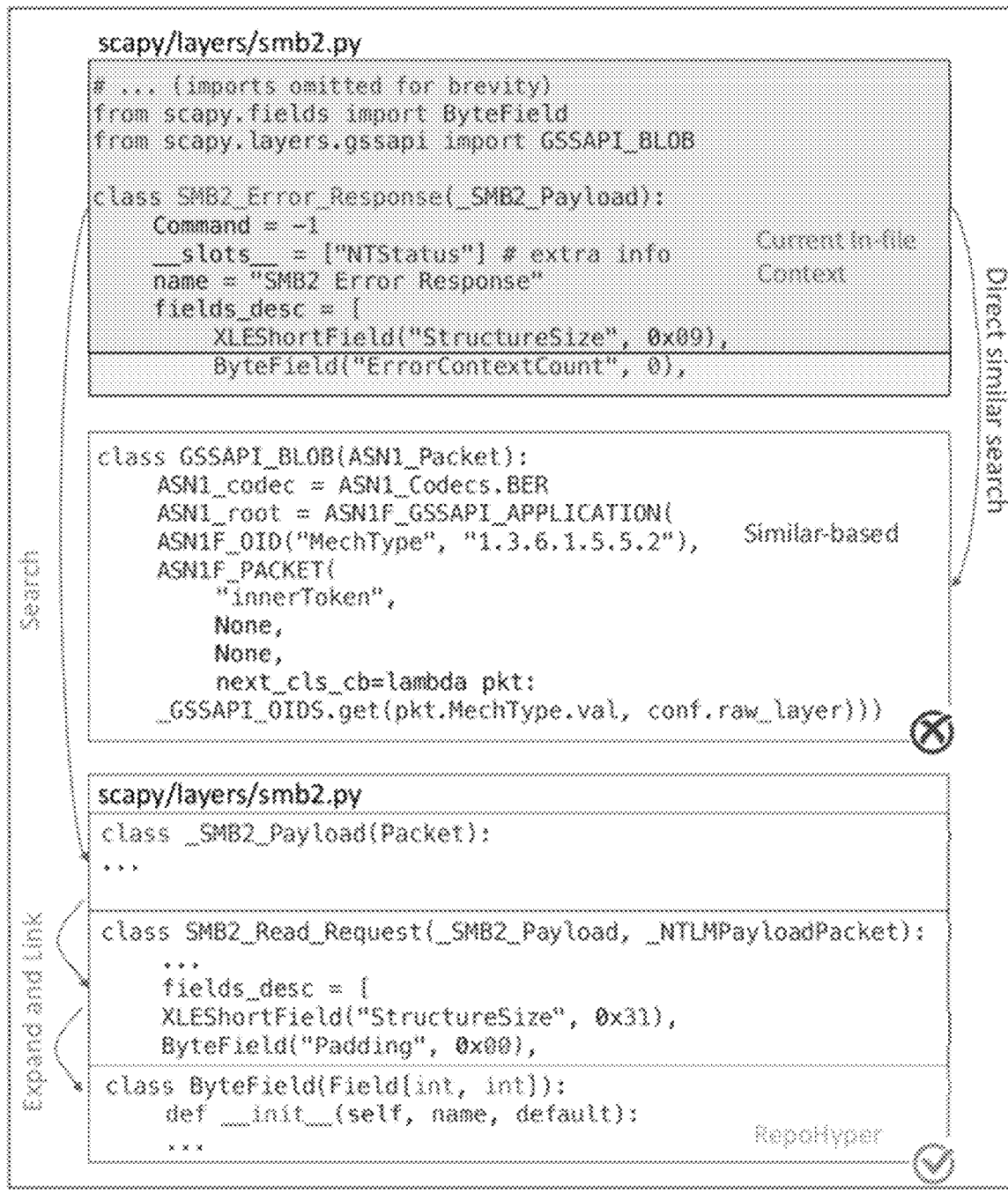
FIG. 5 illustrates an example of a semantic graph-based search compared to a similarity-based search according to an exemplary embodiment of the invention.

Refer to FIG. 5, which illustrates an example of semantic graph-based search compared to similarity-based search according to the exemplary embodiment of the invention. Specifically, when performing a search in the same file (Current In-file Context), then expanding and predicting the connections of the components in the source code based on the context, the code completion result will be more accurate than the direct similarity search method. Because the direct similarity search method often focuses on the wrong class due to the similarity in form of the classes and lack of context, it leads to unsuccessful code completion. For example, the GSSAPI_BLOB result in the FIG. 5 has nothing to do with the SMB2 context, but is still found because of its similar structure. In contrast, the classes, functions and relationships on the semantic graph have been clearly and tightly constructed to avoid confusion between classes. For example, in FIG. 5, the classes _SMB2_Payload and SMB2_Read_Request are found because they have a close semantic and structural relationship with the SMB2_Error_Response class, which helps generate more suitable code.

The term "source code" is a set of human-readable instructions or statements written in a programming language that a software developer creates to instruct a computer or software system on how to perform a specific task or function. These instructions are written using tokens, symbols, and structures that programmers can comprehend and work with to create software applications.

The term "code completion" is an automated method to assist programmers in completing code quickly and reducing errors by suggesting code segments that can be completed based on the current context.

The term "Large Language Models (LLM)" refers to a type of foundational model that uses deep learning techniques and huge datasets to recognize, understand, and generate human-like content. LLMs can perform a variety of language tasks, such as question answering, text summarization, translation between languages, content writing, and many other complex tasks.

The term "configured" relates to computer systems and program components. For a system consisting of one or more computers configured to perform specific operations or actions means that the system has software, firmware, hardware, or a combination of software, firmware, hardware, or a combination thereof installed in the course of its operation that causes the system to perform the operations or actions. For a computer program or programs configured to perform specific operations or actions means one or more programs consisting of instructions that, when executed by data processing equipment, cause the equipment to perform the operations or actions.

The term "semantic graph" represents information in a structured and understandable way, it describes reality using nodes representing things, events, concepts and edges representing relationships between those nodes.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Source code is essential for software development, debugging, maintenance, and collaboration among developers, as it provides a structured and understandable representation of the logic and behavior of a software application or system.

Therefore, the present invention provides a repository-level semantic graph system that is a novel framework created to address the diverse challenges of repository-level end-to-end code completion. Therein, a novel graph called a repository-level semantic graph is designed to capture the global context of a repository, which can be extended to include dissimilar repositories while still understanding relevant context for repository-level code completion. This innovation significantly improves the accuracy and relevance of context retrieval compared to other conventional methods.

Specifically, constructing a repository-level semantic graph helps to capture the comprehensive context of a code repository by representing the complex relationships and dependencies between different code components. It enables precise context retrieval and clear separation of function calls and class-method relationships, and also ensures accurate context segmentation, eliminating the need for manual segmentation and sizing. This is the basis for the system to use an extended and refined retrieval method including an extended graph and a link prediction algorithm to improve the accuracy and relevance of code completion suggestions.

DESCRIPTION OF NUMERALS

100 Repository-level semantic graph system
101 Query
102 Context
103 Node embedding
104 Set of anchor nodes
105 Set of expanded nodes
106 Set of updated node embeddings
107 Ranked list of nodes
108 Set of top nodes
109 Final code completion
110 Source code initialization module
111 Source code repository module
112 LLM Encoding Module
113 Repository-level semantic graph
114 Search module
115 Expansion module
116 Update module
117 Re-ranking module
118 Node selection module
119 LLM decoding module

What is claimed is:

1. A repository-level semantic graph system stored in a computer readable memory for repository-level code completion, the repository-level semantic graph system includes:

a source code initialization module, which is used to generate a query;

a source code repository module that is a collection of source code that is systematically organized, stored, and generate a context;

a Large Language Model (LLM) encoding module configured to receive the query, and embed the context for the query to generate a corresponding node embedding;

a repository-level semantic graph is center of the repository-level semantic graph system, which is constructed to encapsulate broad context of a code repository based on the source code repository module;

wherein the semantic graph construction at the repository level semantic graph is performed according to following steps:

i) initializing the models;

wherein, initializing models by importing all necessary libraries and the models, ensuring that a necessary infrastructure such as an Abstract Syntax Tree (AST), a call graph generator, or a class hierarchy parser is in place;

ii) loading and parsing code file after step i) which comprises:

receiving as input a directory path containing the code file;

parsing each file in the directory path by parsing the code file with a tree-sitter to extract the abstract syntax tree (AST); identifying and extracting functions, classes, and methods from the AST; and storing each element with its name, context (body), parameters, and location;

generating an extracted code element (functions, classes, methods, scripts);

iii) generating nodes for code elements;

wherein, receive the extracted code element (functions, classes, methods, scripts) in step ii) as input and initializes an empty graph structure;

wherein, generate a node in the graph for each extracted code element and attaches metadata such as name, parameters, and context to the node;

iv) defining relationships between nodes which is done after generating the nodes in step iii);

wherein, defines the relationships between the nodes which initializes dictionaries for different types of the relationships: import, invoke, ownership, encapsulate, class hierarchy;

wherein, for each code element: identify imports and create edges for imported elements, identify function/method calls and create call edges via call graph generator, identify parent-child relationships between classes and methods and create ownership edges, identify file-level script scopes and create encapsulation edges, and identify class inheritance and create class hierarchy edges;

generating a code context of nodes;

v) generating embeddings for the code elements;

receiving as input the code context of nodes in step iv);

each node in the graph will be processed using an encoder-only embedding model such as CodeT5 or UniXcoder to generate an embedding representing a semantic meaning of the code element used for comparison as well as retrieval of relevant contexts later, and store the embeddings in a dictionary mapped to the node;
generating an embedding for each node; and
vi) constructing the empty graph structure receiving the embedding of each node in step v);
in which, construct the graph by adding all nodes and edges to the graph based on the defined relationships, ensuring that all nodes are connected according to the defined relationships (import, call, own, encapsulate, class hierarchy);
wherein, the repository-level semantic graph comprises:
a search module configured to receive as input the node embedding, and search for nodes that are similar to the node embedding to generate a set of anchor nodes in the repository-level semantic graph;
an expansion module configured to receive as input the set of anchor nodes, and expand nodes in the set of anchor nodes to generate a set of expanded nodes;
an update module configured to receive as input the set of expanded nodes, and update new context information for each node in the set of expanded nodes to generate a set of updated node embeddings;
a re-ranking module configured to:
receive input the set of updated node embeddings and the node embedding;
re-update the new context information when integrating the node embedding into the repository-level semantic graph before reranking;
score links for the updated nodes using a message-passing network and a link prediction for each node in the set of updated node embeddings against the node embedding for re-ranking, and generating a ranked list of nodes;
a node selection module configured to receive input the list of ranked nodes, select a number of most relevant top nodes in the list of ranked nodes to generate a set of top nodes; and
a Large Language Models (LLM) decoding module configured to receive as input the set of top nodes, and the query; extract the new contexts in the set of top nodes for decoding, complete a specific code for the query, and generate a final code completion in response to the update module and the source code repository module.

2. The system of claim 1, wherein the repository-level semantic graph has three types of nodes: function/method, class, and script node;
wherein, each node consists of: name, context (body of function/method), parameters, and location.

3. The system of claim 1, wherein the repository-level semantic graph has nodes that are interconnected based on following types of relationships: import relations, in-voke relations, ownership relations, encapsulate relations, and class hierarchy relations.

4. The system of claim 1, wherein the search module performs a k-Nearest Neighbor (kNN) search to find k nodes that are similar to the node embedding.

5. The system of claim 1, wherein the extension module performs the expansion using an exhaustive search strategy and a pattern search strategy;
wherein, the exhaustive search strategy uses a Breadth First Search (BFS) algorithm with a maximum depth D;
wherein, the pattern search strategy uses frequent path sets to eliminate infrequent paths during the exhaustive search.

6. The system of claim 1, wherein the update module and the re-ranking module use a deep learning model to generate or update nodes for each node if there is a change due to a source code update.

7. The system of claim 1, wherein the re-ranking module uses final node embeddings after going to a messaging network to calculate an association score, and determines a relevance of each context to the node embedding;
a message passing network formula used is:

$$Z_i^{(L)} = f(Z_i^{(O)}, G \oplus Q);$$

wherein, $Z_i^{(O)}$ is an initial embedding obtained from an encoder for ith node in the repository-level semantic graph;
$Z_i^{(L)}$ is final layer L embedding after going to message passing network f;
$G \oplus Q$ is continuation of a query node Q where the query is raw source code of the node and $Z_Q$ is the initial embedding into the graph G.

8. The system of claim 1, wherein the re-ranking module uses the link prediction to calculate a link score having formula:

$$s_i = W^T \text{concat}(Z_i^{(L)}, Z_Q^{(L)}) \forall i \in \{i | V_i \in A_{exp}\};$$

wherein:
$s_i$ is the linking score between query node Q and node i;
W is a parameter that acts as a weight vector;
$Z_i^{(L)}$ is the embedding of node i after L layers;
$Z_Q^{(L)}$ is the embedding of the query node Q after the L layers;
concat $(Z_i^{(L)}, Z_i^{(L)})$ is a concatenation of two vectors $Z_i^{(L)}$ và $Z_Q^{(L)}$;
$A_{exp}$ is the set of expanded nodes.

9. The system of claim 1, wherein the LLM decoding module uses a large language model, a LLM Code, to generate a complete code snippet based on relevant contexts of the set of top nodes, and the query.

10. The system of claim 1, wherein the LLM decoding module has the set of top nodes that respond to the update module and the source code repository module stored in a data set for the purpose of serving subsequent code completion tasks or result checking, as well as updating and improving model in the repository-level semantic graph system.

11. A method for completing source code using a repository-level semantic graph system comprising: a source code initialization module, a source code repository module, a Large Language Models (LLM) encoding module, a repository-level semantic graph, a search module, an expansion module, an update module, a re-ranking module, a node selection module, and a Large Language Models (LLM) decoding module, the method comprising following steps:
a) initializing the query and necessary parameters;
wherein, initializing a query using the source code initialization module;
wherein, initializing other parameters in the system such as kNN neighbor search parameter for the search module, an extension parameter for the extension module, and a link prediction for the re-ranking module;
b) assembling, storing code using the source code repository module, and generating a context;
c) receiving the query as input, using the LLM encoding module to embed the context for the query, and generating a node embedding;
d) constructing a semantic graph at the repository-level semantic graph;

wherein the semantic graph construction at the repository level semantic graph is performed according to following steps:
i) initializing the models;
  wherein, initializing models by importing all necessary libraries and the models, ensuring that a necessary infrastructure such as an Abstract Syntax Tree (AST), a call graph generator, or a class hierarchy parser is in place;
ii) loading and parsing code file after step i) which comprises:
  receiving as input a directory path containing the code file;
  parsing each file in the directory path by parsing the code file with a tree-sitter to extract the abstract syntax tree (AST); identifying and extracting functions, classes, and methods from the AST; and storing each element with its name, context (body), parameters, and location;
  generating an extracted code element (functions, classes, methods, scripts);
iii) generating nodes for code elements;
  wherein, receive the extracted code element (functions, classes, methods, scripts) in step ii) as input and initializes an empty graph structure;
  wherein, generate a node in the graph for each extracted code element and attaches metadata such as name, parameters, and context to the node;
iv) defining relationships between nodes which is done after generating the nodes in step iii);
  wherein, defines the relationships between the nodes which initializes dictionaries for different types of the relationships: import, invoke, ownership, encapsulate, class hierarchy;
  wherein, for each code element: identify imports and create edges for imported elements, identify function/method calls and create call edges via call graph generator, identify parent-child relationships between classes and methods and create ownership edges, identify file-level script scopes and create encapsulation edges, and identify class inheritance and create class hierarchy edges;
  generating a code context of nodes;
v) generating embeddings for the code elements;
  receiving as input the code context of nodes in step iv);
  each node in the graph will be processed using an encoder-only embedding model such as CodeT5 or UniXcoder to generate an embedding representing a semantic meaning of the code element used for comparison as well as retrieval of relevant contexts later, and store the embeddings in a dictionary mapped to the node;
  generating an embedding for each node; and
vi) constructing the empty graph structure receiving the embedding of each node in step v);
  in which, construct the graph by adding all nodes and edges to the graph based on the defined relationships, ensuring that all nodes are connected according to the defined relationships (import, call, own, encapsulate, class hierarchy);
e) receiving the node embedding as input, using the search module to search for nodes that are similar to the node embedding, and generating a set of anchor nodes;
f) receiving the set of anchor nodes as input, using the expansion module to expand the nodes in the set of anchor nodes, and generating a set of expanded nodes;
g) receiving the set of extended nodes as input, using the update module to update new context information for each node in the set of extended nodes, and generating a set of updated node embeddings;
h) receiving the set of updated node embeddings as input, and the node embedding, using the re-ranking module to re-update the new context information when integrating the node embedding into the repository-level semantic graph before re-ranking;
j) scoring links for the updated nodes using a message passing network and the predicting link for each node in the set of updated node embeddings for the node embedding, using the re-ranking module to re-rank, and generating a ranked list of nodes;
k) receiving the ranked list of nodes as input, using the node selection module to select a number of most relevant top nodes in the ranked list of nodes, and generating a set of top nodes; and
l) receiving the set of top nodes, and the query as input, using the LLM decoding module to extract the new contexts in the top node set for decoding, completing a specific code for the query, and generate a final code completion in response to the update module and the source code repository module.

12. One or more non-transitory computer storage media that stores instructions that, when executed by one or more computers, cause one or more computers to perform operations to complete repository-level source code using repository-level semantic graph system, wherein the repository-level semantic graph system comprises: a source code initialization module, a source code repository module, a Large Language Models (LLM) encoding module, a repository-level semantic graph, a search module, an expansion module, an update module, a re-ranking module, a node selection module, and a Large Language Models (LLM) decoding module, wherein the operations comprise:
a) initializing a query and necessary parameters;
  wherein, initializing the query using the source code initialization module;
  wherein, initializing other parameters in the system such as kNN neighbor search parameter for the search module, an extension parameter for the extension module, and a link prediction for the re-ranking module;
b) assembling, storing code using the source code repository module, and generating a context;
c) receiving the query as input, using the LLM encoding module to embed the context for the query, and generating a node embedding;
d) constructing a semantic graph at the repository-level semantic graph;
  wherein the semantic graph construction at the repository level semantic graph is performed according to following steps:
  i) initializing the models;
    wherein, initializing models by importing all necessary libraries and the models, ensuring that a necessary infrastructure such as an Abstract Syntax Tree (AST), a call graph generator, or a class hierarchy parser is in place;
  ii) loading and parsing code file after step i) which comprises:
    receiving as input a directory path containing the code file;
    parsing each file in the directory path by parsing the code file with a tree-sitter to extract the abstract syntax tree (AST); identifying and extracting functions, classes, and methods from the AST; and storing each element with its name, context (body), parameters, and location;

generating an extracted code element (functions, classes, methods, scripts);

iii) generating nodes for code elements;

wherein, receive the extracted code element (functions, classes, methods, scripts) in step ii) as input and initializes an empty graph structure;

wherein, generate a node in the graph for each extracted code element and attaches metadata such as name, parameters, and context to the node;

iv) defining relationships between nodes which is done after generating the nodes in step iii);

wherein, defines the relationships between the nodes which initializes dictionaries for different types of the relationships: import, invoke, ownership, encapsulate, class hierarchy;

wherein, for each code element: identify imports and create edges for imported elements, identify function/method calls and create call edges via call graph generator, identify parent-child relationships between classes and methods and create ownership edges, identify file-level script scopes and create encapsulation edges, and identify class inheritance and create class hierarchy edges;

generating a code context of nodes;

v) generating embeddings for the code elements;

receiving as input the code context of nodes in step iv);

each node in the graph will be processed using an encoder-only embedding model such as CodeT5 or UniXcoder to generate an embedding representing a semantic meaning of the code element used for comparison as well as retrieval of relevant contexts later, and store the embeddings in a dictionary mapped to the node;

generating an embedding for each node; and vi) constructing the empty graph structure receiving the embedding of each node in step v);

in which, construct the graph by adding all nodes and edges to the graph based on the defined relationships, ensuring that all nodes are connected according to the defined relationships (import, call, own, encapsulate, class hierarchy);

e) receiving the node embedding as input, using the search module to search for nodes that are similar to the node embedding, and generating a set of anchor nodes;

f) receiving the set of anchor nodes as input, using the expansion module to expand the nodes in the set of anchor nodes, and generating a set of expanded nodes;

g) receiving the set of extended nodes as input, using the update module to update new context information for each node in the set of extended nodes, and generating a set of updated node embeddings;

h) receiving the set of updated node embeddings as input, and the node embedding, using the re-ranking module to re-update the new context information when integrating the node embedding into the repository-level semantic graph before re-ranking;

j) scoring links for the updated nodes using a message passing network and the predicting link for each node in the set of updated node embeddings for the node embedding, using the re-ranking module to re-rank, and generating a ranked list of nodes;

k) receiving the ranked list of nodes as input, using the node selection module to select a number of most relevant top nodes in the ranked list of nodes, and generating a set of top nodes; and l) receiving the set of top nodes, and the query as input, using the LLM decoding module to extract the new contexts in the top node set for decoding, completing a specific code for the query, and generate a final code completion in response to the update module and the source code repository module.

* * * * *